(12) United States Patent
Klein et al.

(10) Patent No.: US 7,428,909 B2
Klein et al.
(45) Date of Patent: Sep. 30, 2008

(54) FIXTURES FOR TRAPPING CONDENSATION

(75) Inventors: Donald J. Klein, Jackson, TN (US); Robert P. Scifres, Brownsville, TN (US)

(73) Assignee: Lasco Fittings, Inc., Brownsville, TN (US)

( * ) Notice: Subject to any disclaimer, the term of this patent is extended or adjusted under 35 U.S.C. 154(b) by 587 days.

(21) Appl. No.: 10/984,479

(22) Filed: Nov. 9, 2004

(65) Prior Publication Data

US 2006/0097427 A1    May 11, 2006

(51) Int. Cl.
*F16K 13/10* (2006.01)

(52) U.S. Cl. ............................... 137/247.33; 4/679

(58) Field of Classification Search ............ 62/93, 62/285; 137/247.33, 247.35, 247.39, 247.41, 137/247.49; 4/679
See application file for complete search history.

(56) References Cited

U.S. PATENT DOCUMENTS

| | | | | |
|---|---|---|---|---|
| RE5,953 E | * | 6/1874 | Lowe | ............... 137/247.49 |
| 162,331 A | * | 4/1875 | Aree et al. | ............ 137/247.35 |
| 178,577 A | * | 6/1876 | Adee et al. | ............ 137/247.35 |
| 200,277 A | * | 2/1878 | Gisel | ............... 137/247.49 |
| 1,308,582 A | * | 7/1919 | Cronk | ............... 137/247.41 |
| 1,608,929 A | * | 11/1926 | Edelman | ............ 137/247.41 |
| 3,228,817 A | * | 1/1966 | Savko | ............... 156/82 |
| 3,954,116 A | * | 5/1976 | Guth et al. | ............... 134/183 |
| 4,184,834 A | | 1/1980 | Barber | |
| 5,644,925 A | * | 7/1997 | Chaves | ............... 62/289 |
| 6,282,359 B1 | | 8/2001 | Jacobs et al. | |
| 2002/0116759 A1 | * | 8/2002 | Mantyla et al. | ............... 4/679 |

OTHER PUBLICATIONS

Brusha RF, "Condensate Traps for Cooling Coils", *HPAC Engineering*, Oct. 2001, pp. 44-46.

* cited by examiner

*Primary Examiner*—William E Tapolcai
(74) *Attorney, Agent, or Firm*—Calfee, Halter & Griswold LLP

(57) ABSTRACT

Fixtures for trapping condensation, molds, methods of making fixtures and air conditioning systems are disclosed. The fixtures have a hollow body and at least one curved portion in which condensation may be trapped. The mold incorporates at least one mold core that may be removed from the curved portion of the molded fixture after molding.

71 Claims, 11 Drawing Sheets

FIXTURES FOR TRAPPING CONDENSATION

BACKGROUND

The present invention relates generally to fixtures, methods of making fixtures, and systems employing fixtures that may trap condensation. More particularly, the present invention relates to fixtures that may be formed by molding.

Many air conditioning systems produce condensation that should be vented to the ambient atmosphere so that the humidity of the air conditioned environment may be maintained. Additionally, the condensation venting system should prevent air from the ambient atmosphere from entering the air conditioned environment. Some air conditioning system employ a condensation trap. However, many condensation traps are formed by heating a plastic pipe and bending it into a desired shape. This procedure can be both time consuming and costly.

Therefore a need exists for fixtures and methods of making fixtures that may trap condensation. Additionally, a need exists for systems employing such fixtures.

SUMMARY

In accordance with an embodiment of the present invention, a condensation trap, comprising a hollow body having a first end and a second end is provided. The hollow body comprises at least a first curved portion. The first curved portion comprises a first inner periphery. The first curved portion comprises a first central axis having a radius selected such that a first mold core section defining the first inner periphery of the first curved portion may be removed through one of the first end or the second end of the hollow body. The radius of the first central axis is further selected such that liquid may be trapped in at least a portion of the hollow body.

In accordance with another embodiment of the present invention, a fixture is provided. The fixture has a hollow body having at least first and second openings and upper and lower portions. The lower portion forms a vessel for holding liquid, and part of the upper portion extends into the vessel to cooperate with liquid in the vessel to act as a barrier to prevent air from traveling between the first opening and the second opening. The vessel is molded integrally with the hollow body.

In accordance with yet another embodiment of the present invention, a fixture having a hollow body having at least first and second openings and upper and lower portions is provided. The lower portion forms a vessel for holding liquid. Part of the upper portion extends into the vessel to cooperate with liquid in the vessel to act as a barrier to prevent air from traveling between the first opening and the second opening while permitting liquid to flow from the second opening to the first opening. The vessel is molded integrally with the hollow body.

In accordance with a further embodiment of the present invention, a fixture is provided. The fixture has a hollow body having at least first and second openings and upper and lower portions, and the lower portion forms a vessel for holding liquid. The fixture has a dam extending from the upper portion toward the vessel. The dam extends into the vessel to permit the dam to cooperate with liquid in the vessel to act as a barrier to prevent air from traveling between the first opening and the second opening.

In accordance with yet another embodiment of the present invention, a fixture is provided. The fixture has a hollow body having at least first and second openings and upper and lower portions, and the lower portion forms a vessel for holding liquid. The fixture has a dam extending from the upper portion toward the vessel, and the dam extends into the vessel to permit the dam to cooperate with liquid in the vessel to act as a barrier to prevent air from traveling between the first opening and the second opening while permitting liquid to flow from the first opening to the second opening.

In accordance with still another embodiment of the present invention, a mold is provided. The mold comprises at least one mold cavity disposed to define the outer periphery of a hollow body having at least a first curved portion, and the mold cavity comprises a first end and a second end. The mold comprises a first inner mold core disposed in the mold cavity to define an inner periphery of the first curved portion. The first inner mold core comprises a first end disposed proximate to said first end of the mold cavity and a second end. The first inner mold core comprises a first central axis having a radius selected such that the first inner mold core may be removed from the hollow body in the direction of the first end of said mold cavity after the hollow body is molded. The radius of the first inner mold core is selected such that liquid may be trapped along at least a portion of the hollow body after the hollow body is molded.

In accordance with yet another embodiment of the present invention, a method of molding a condensation trap is provided. The method comprises injecting moldable plastic into the interior of a mold comprising a mold cavity having a first inner mold core disposed therein to form a hollow body. The mold cavity defines an outer periphery of the hollow body, and the first inner mold core defines an inner periphery of a first curved portion of the hollow body. The first inner mold core comprises a first central axis having a radius selected such that liquid may trapped along at least a portion of the hollow body. The method comprises removing the first inner mold core from the hollow body via a first end or a second end of the hollow body.

In accordance with another embodiment of the present invention, a system for conditioning air is provided. The system comprises an air conditioning system and a condensation trap. The condensation trap is in communication with the air conditioning system, and the condensation trap is in communication with an external ambient environment. The condensation trap is disposed such that condensation from the air conditioning system may flow through the condensation trap to the external ambient environment and air from the external ambient environment may not flow into the air conditioning system through the condensation trap. The condensation trap comprises a hollow body having a first end and a second end, and the hollow body comprises at least a first curved portion. The first curved portion comprises a first inner periphery. The first curved portion comprises a first central axis having a radius selected such that a mold core defining the first inner periphery of the first curved portion may be removed through one of the first end or the second end of the hollow body. The radius of the first central axis is further selected such that liquid may be trapped in at least portion of the hollow body.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF ILLUSTRATED EMBODIMENTS

The present invention will now be described with occasional reference to the specific, exemplary embodiments of the invention. This invention may, however, be embodied in different forms and should not be construed as limited to the exemplary embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Figure 1:
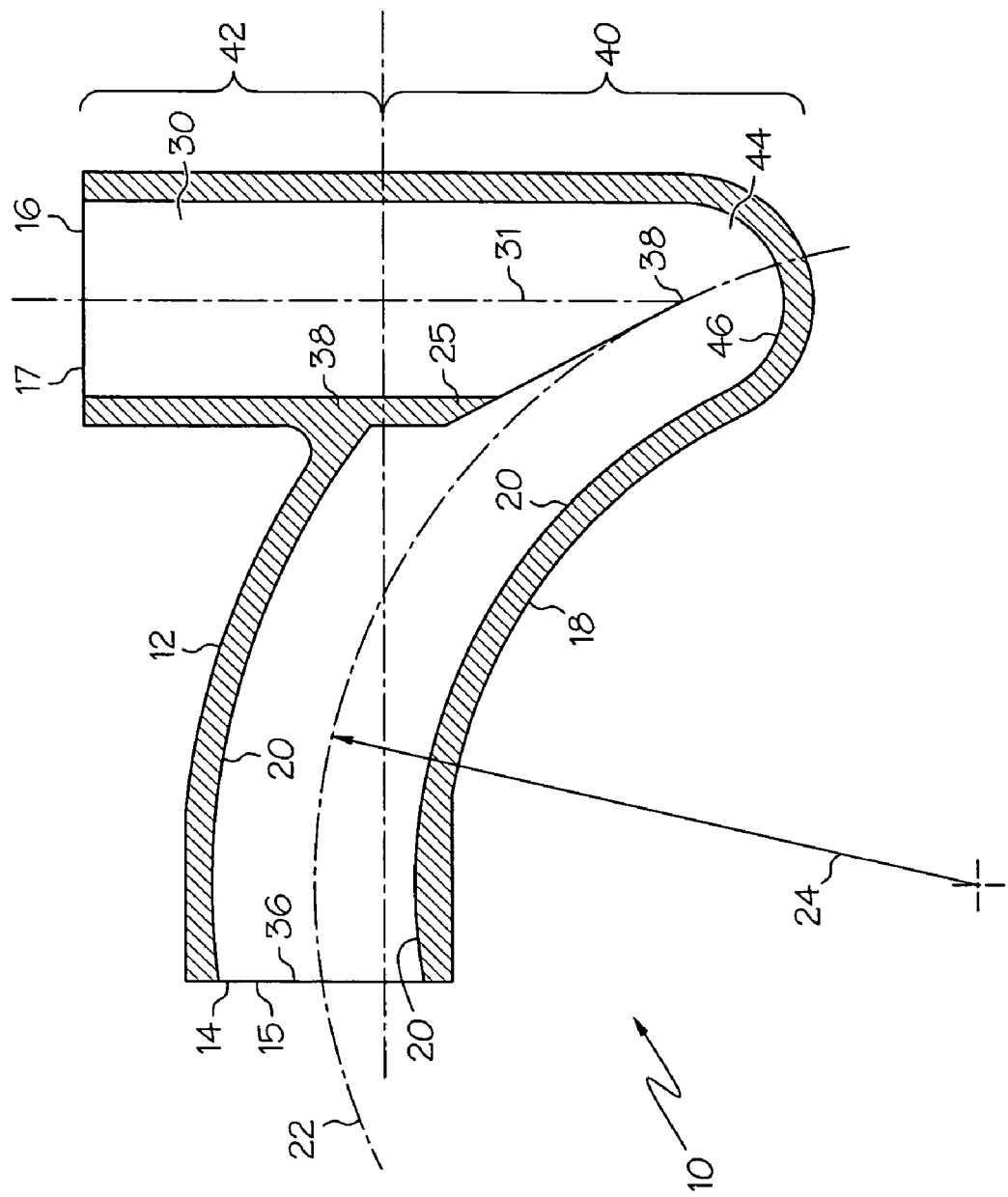
FIG. 1 is a sectional view of an exemplary fixture in accordance with embodiments of the present invention.
Figure 2:
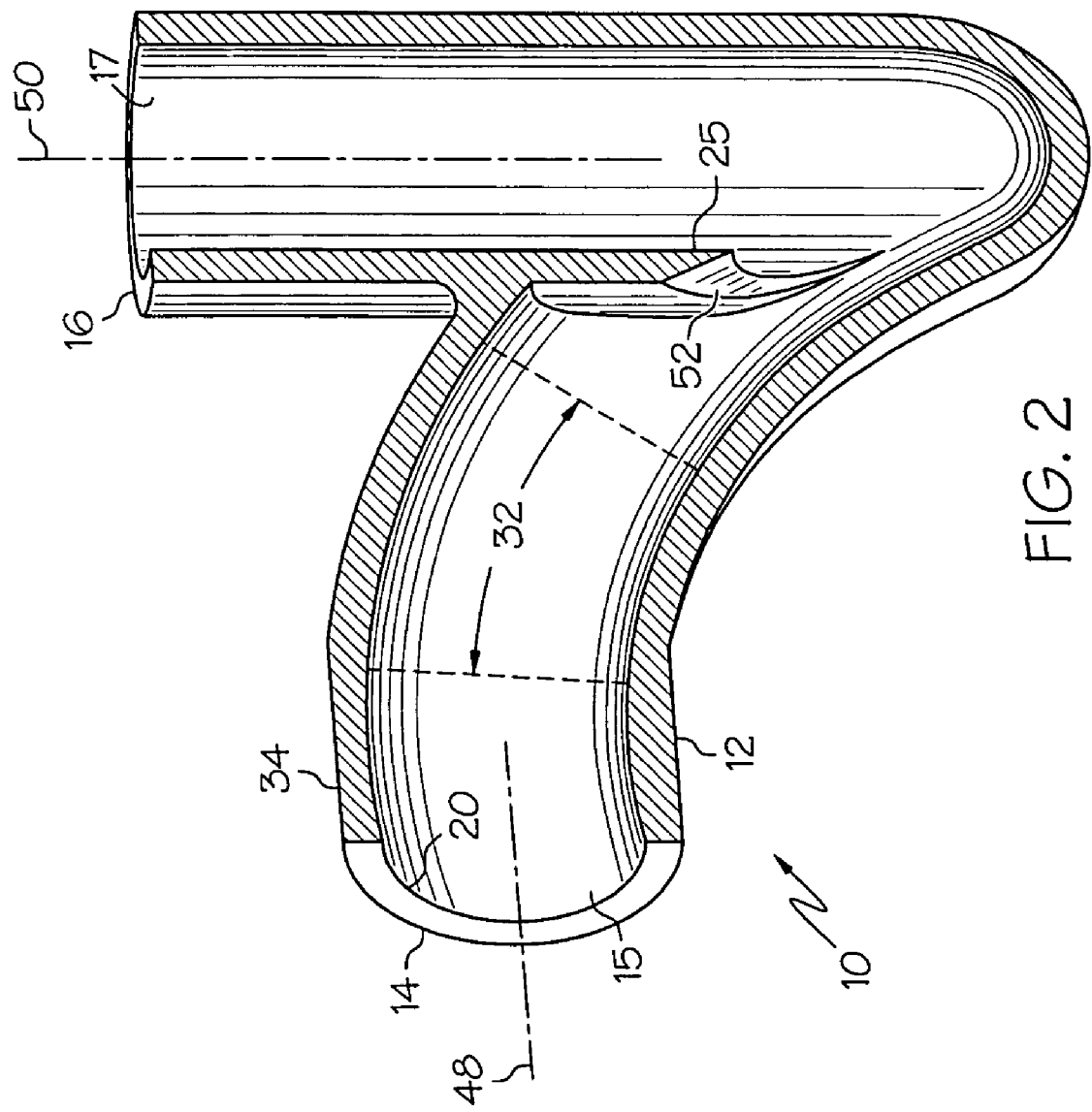
FIG. 2 is an isometric sectional view of an exemplary fixture in accordance with embodiments of the present invention.
Figure 3:
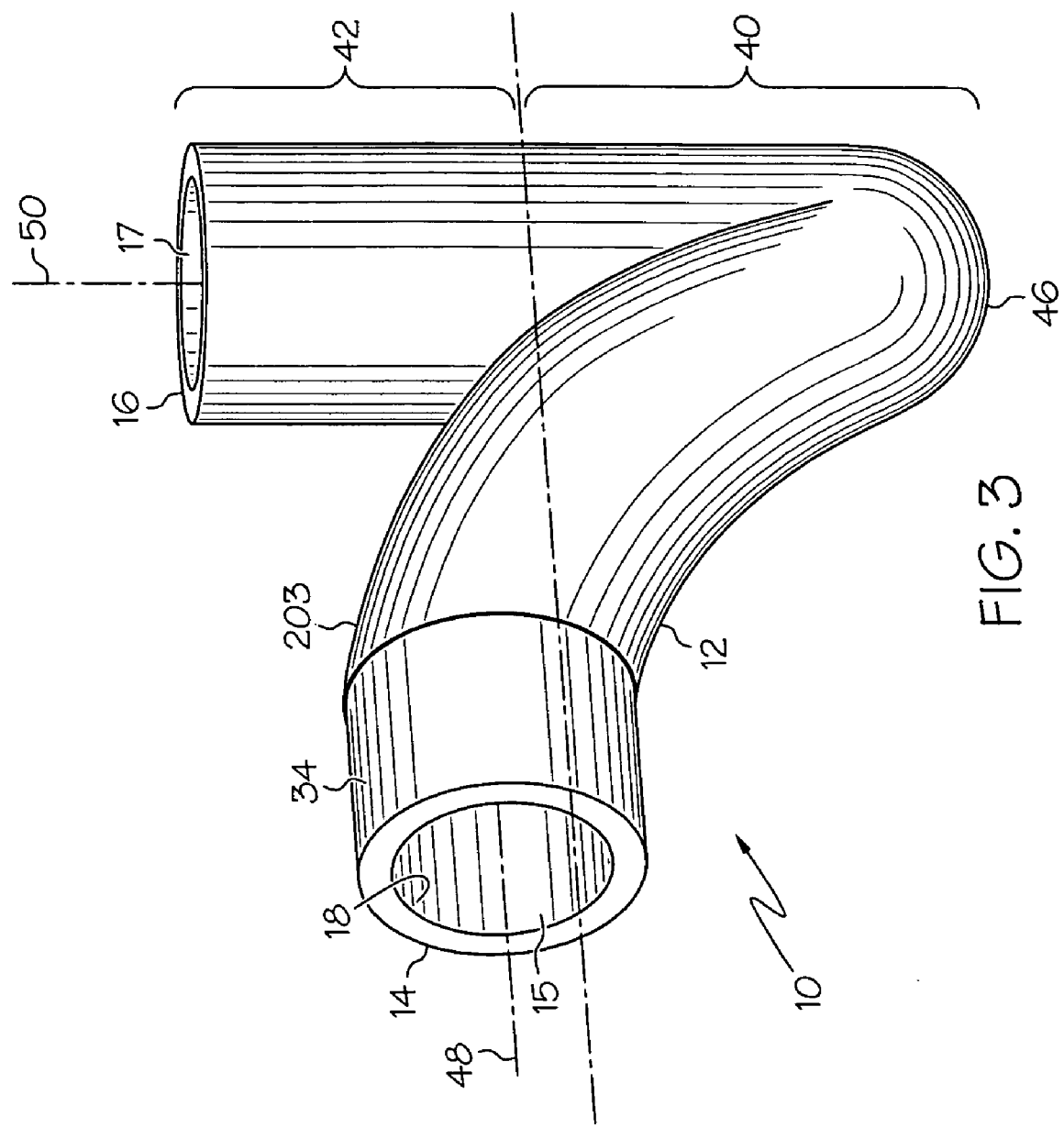
FIG. 3 is an isometric view of an exemplary fixture in accordance with embodiments of the present invention.

Referring to FIGS. 1, 2, and 3, one exemplary embodiment of a fixture 10 is illustrated. The exemplary fixture 10 as shown has a hollow body 12, and the fixture 10 may be a condensation trap. The hollow body 12 has a first end 14 and a first opening 15. The hollow body 12 also has a second end 16 and a second opening 17. The hollow body 12 may be made from any suitable material. For example, the hollow body 12 may be plastic, and the plastic may be a moldable. In another example, the hollow body 12 may be polyvinyl chloride. In yet another example, the hollow body 12 may be chlorinated polyvinyl chloride, acrylonitrile butadiene, polypropylene plastic, or acetal plastic. The hollow body 12 may be of any suitable size. For example, the hollow body 12 may have at least a portion having an outer diameter of ½ inch, ¾ inch, 1 inch, 1¼ inches, 1½ inches, 1¾ inches, and 2 inches.

Figure 4:
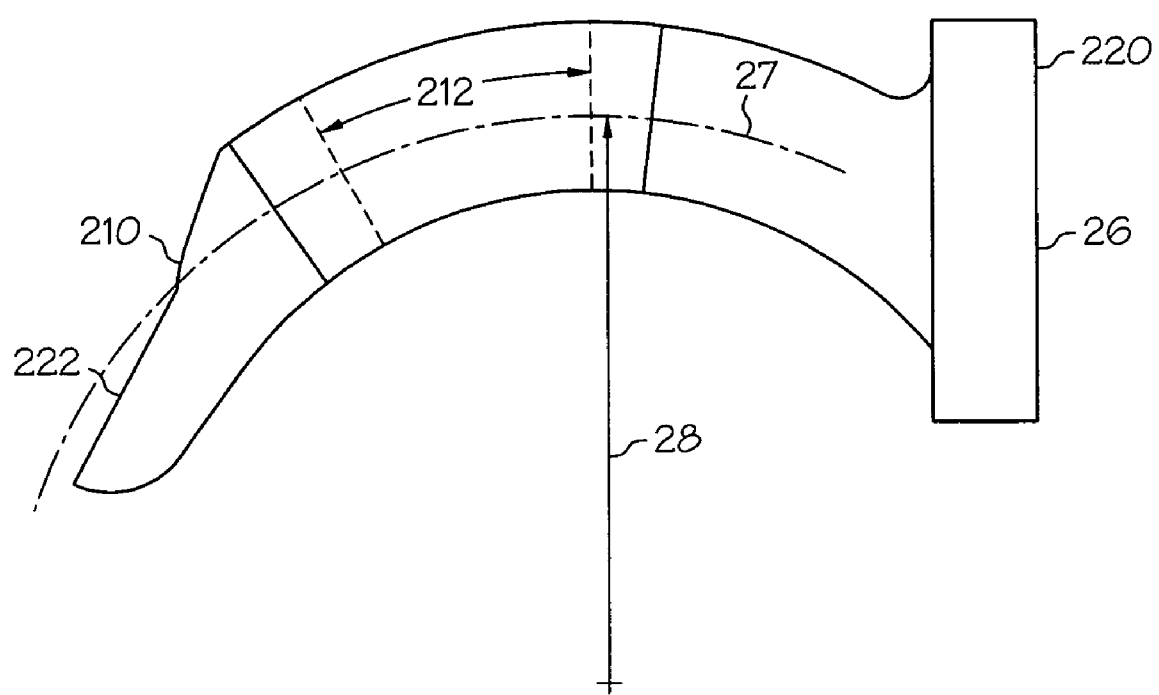
FIG. 4 is an illustration of an exemplary mold core section in accordance with embodiments of the present invention.

Referring now to FIGS. 1, 2, 3, and 4, the hollow body 12 may have a first curved portion 18 having a first inner periphery 20. The first inner periphery 20 of the first curved portion 18 has a first central axis 22 having a radius 24. The first central radius 24 is selected such that a first mold core section 26 defining the first inner periphery 20 may be removed through one of the first end 14 or the second end 16 of the hollow body 12. Additionally, the radius 24 is selected such that liquid may be trapped in at least a portion of the hollow body 12. The radius 24 may be any suitable radius. For example, the radius 24 may be from about 2.2 inches/mm to about 2.7 inches. It will be understood that radius 24 does not have to be of a particular dimension. Instead, the radius 24 can be selected depending on the desired size and layout of the hollow body 12. In other examples, the radius 24 may be about 2.6 inches, about 2.64 inches, or about 2.639 inches. The first mold core section 26 may have a central axis 27 having a radius 28, and the radius 28 may be any suitable radius. For example, the radius 28 may be from about 2.6 inches to about 3.0 inches. It will be understood that the radius 28 does not have to be of a particular dimension, and the radius 28 can be selected depending on the desired size and layout of the hollow body 12. In other examples, the radius may be about 2.6 inches, about 2.65 inches, or about 2.656 inches. The first mold core section 26 may be slightly tapered as illustrated in FIG. 4.

The first inner periphery 20 of the first curved portion 18 may have at least a portion 32 shaped substantially like a section of a toroid. It will be understood that the curved portions of the present invention may have just a portion or portions of the surface shaped like a toroid. Alternatively, the curved portions may be shaped entirely like a section of a toroid. For purposes of defining and describing the present invention, the term "toroid" shall be understood as referring to a surface generated by a plane closed curve rotated about a line that lies in the same plane as the curve but does not intersect it. The portion 32 may be shaped substantially like a section of a torus. For purposes of defining and describing the present invention, the term "torus" shall be understood as referring to a doughnut shaped surface generated by a circle rotated about an axis in its plane that does not intersect the circle (e.g., a toroid in which the closed plane is a circle). The portion 32 may be shaped substantially like a tapered section of a toroid or like a tapered section of a torus. The first curved portion 18 may be disposed to from a p-trap as illustrated in FIGS. 1-3. For purposes of defining and describing the present invention, the term "p-trap" shall be understood as referring to a hollow body having one curved portion. The hollow body 12 may also have an non-curved portion 30 having a central axis 31. The first curved portion 18 and the non-curved portion 30 may be disposed such that the first central axis 22 of the first curved portion 18 meets to form a "V" shape with the central axis 31 of the non-curved portion 30.

The first end 14 of the hollow body 12 may be disposed such that a cylindrical tube (not shown) may be fitted over the first end 14 of the hollow body 12. For example, as shown in FIG. 3, the first end 14 may have an area 34 that is cylindrically shaped so that a cylindrical tube may be fitted over at least a portion of the area 34. The second end 16 of the hollow body 12 may be disposed such that a cylindrical tube (not shown) may be fitted over the second end 16 of the hollow body.

The first curved portion 18 may comprise first and second ends 36, 38. The first end 36 of the first curved portion 18 may be proximate to the first end 14 of the hollow body 12, and the first end 36 of the first curved portion 18 may be coincidental with the first end 14 of the hollow body 12. The second end 38 of the first curved portion 18 may comprise a first inner wall portion 25 that extends into the interior of the hollow body 12 toward the first central axis 22. The first inner wall portion 25 may be disposed to form a shaped extension that extends into the interior of the hollow body 12, and the shaped extension 25 may be a dam. For purposes of defining and describing the present invention, the term "dam" shall be understood as referring to a barrier to check the flow of liquid, gas, or air.

Referring again to FIGS. 1, 2, and 3, the hollow body 12 has a lower portion 40 and an upper portion 42. The lower portion 40 may form a vessel for holding liquid. For purposes of defining and describing the present invention, the term "vessel" shall be understood as referring to any suitable container for holding something. A part 25 of the upper portion 42 may extend into the vessel 40. The part 25 of the upper portion 42 extending into the vessel 40 may cooperate with liquid in the vessel 40 to act as a barrier to prevent air from traveling between the first opening 15 and the second opening 17. The part 25 may be a dam. The dam 25 may be molded integrally with the hollow body 12. The dam 25 may have at least a portion that is of substantially uniform thickness, and the dam 25 may have one or more planar faces such as face 52.

The vessel 40 is molded integrally with the hollow body 12. The part 25 of the upper portion 42 extending into the vessel 40 may allow liquid to flow from the second opening 17 to the first opening 15. The hollow body 12 is formed of at least one tube-like member 44 and the vessel 40 is formed at least in part by a bend 46 in the tube-like member 44. The first opening 15 has a central axis 48 and the second opening has a central axis 50. As can be seen in FIGS. 2 and 3, the central axis 48 of the first opening 15 may be perpendicular (or approximately perpendicular) to the central axis 50 of the second opening 17.

The fixture 10 may trap condensation between an air conditioned environment and an ambient environment, and the fixture 10 may prevent air from entering the air conditioned environment via the fixture 10. For example, as discussed above, the dam 25 may cooperate with condensation in the hollow body 12 to prevent air from flowing from a second opening 17 to a first opening 15. In one example, the second opening 17 may be in communication with an air conditioning system, and condensation from the air conditioning system may enter the hollow body 12 from the second opening 17. The dam 25 may cooperate with the trapped condensation from the air conditioning system to prevent air from flowing from the first opening 15 to the second opening 17.

Referring now to FIGS. 5-8, another embodiment of an exemplary fixture 100 is illustrated. The exemplary fixture 100 shown has a hollow body 112, and the fixture 100 may be a condensation trap. Similar to the embodiment illustrated in FIGS. 1-4, the hollow body 112 has a first end 114 and a first opening 115. The hollow body 112 has a second end 116 and a second opening 117. The hollow body 12 may be made from any suitable material as discussed above. The hollow body 112 may be of any suitable size. For example, the hollow body 112 may have at least a portion having an outer diameter of ½ inch, ¾ inch, 1 inch, 1¼ inches, 1½ inches, 1¾ inches, and 2 inches.

The hollow body 112 has a first curved portion 118 having a first inner periphery 120. The first inner periphery 120 of the first curved portion 118 has a first central axis 122 having a radius 124 selected such that a mold core section 126 defining the first inner periphery 120 may be removed through the first end 114 of the hollow body 112. The hollow body 112 has a second curved portion 119 having a second inner periphery 121. The second inner periphery 121 of the second curved portion 119 has a second central axis 123 having a radius 129 selected such that a mold core section 126 defining the second inner periphery 121 may be removed through the second end 116 of the hollow body 112.

Figure 8:
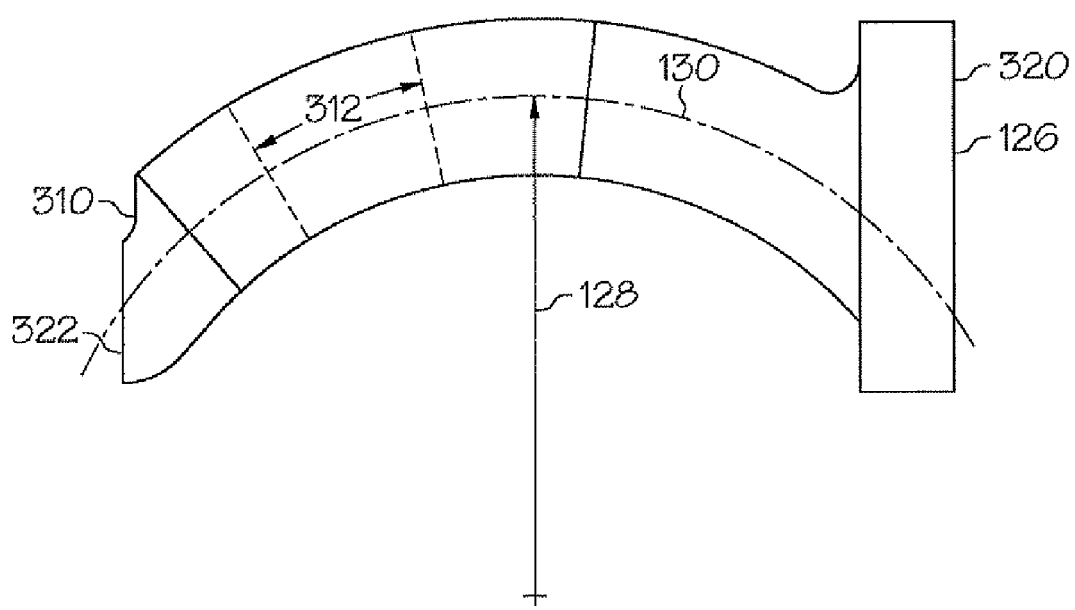
FIG. 8 is an illustration of another exemplary mold core section in accordance with embodiments of the present invention.
Figure 9:
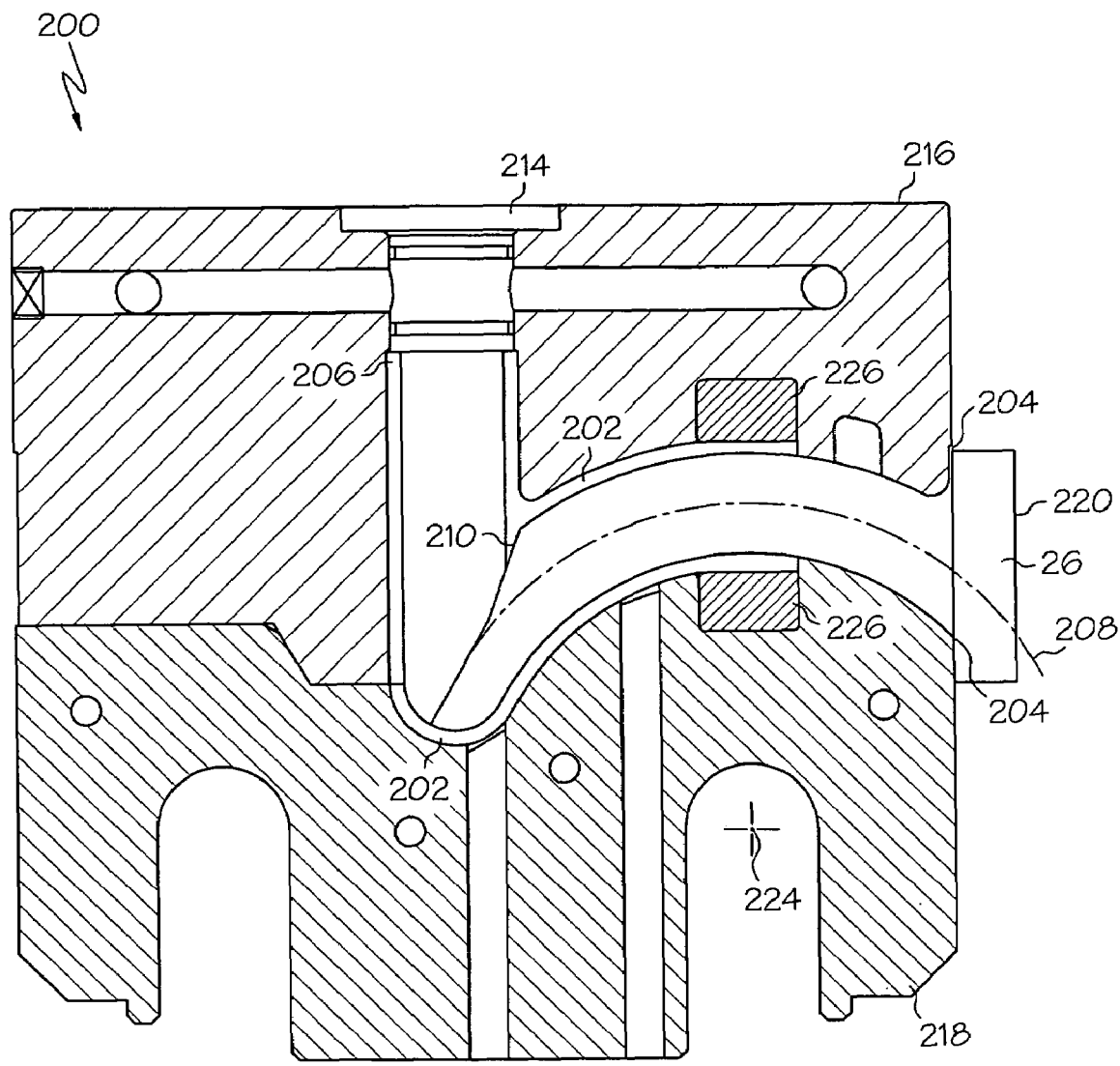
FIG. 9 is an illustration of an exemplary mold in accordance with forming exemplary embodiments of the present invention.
Figure 10:
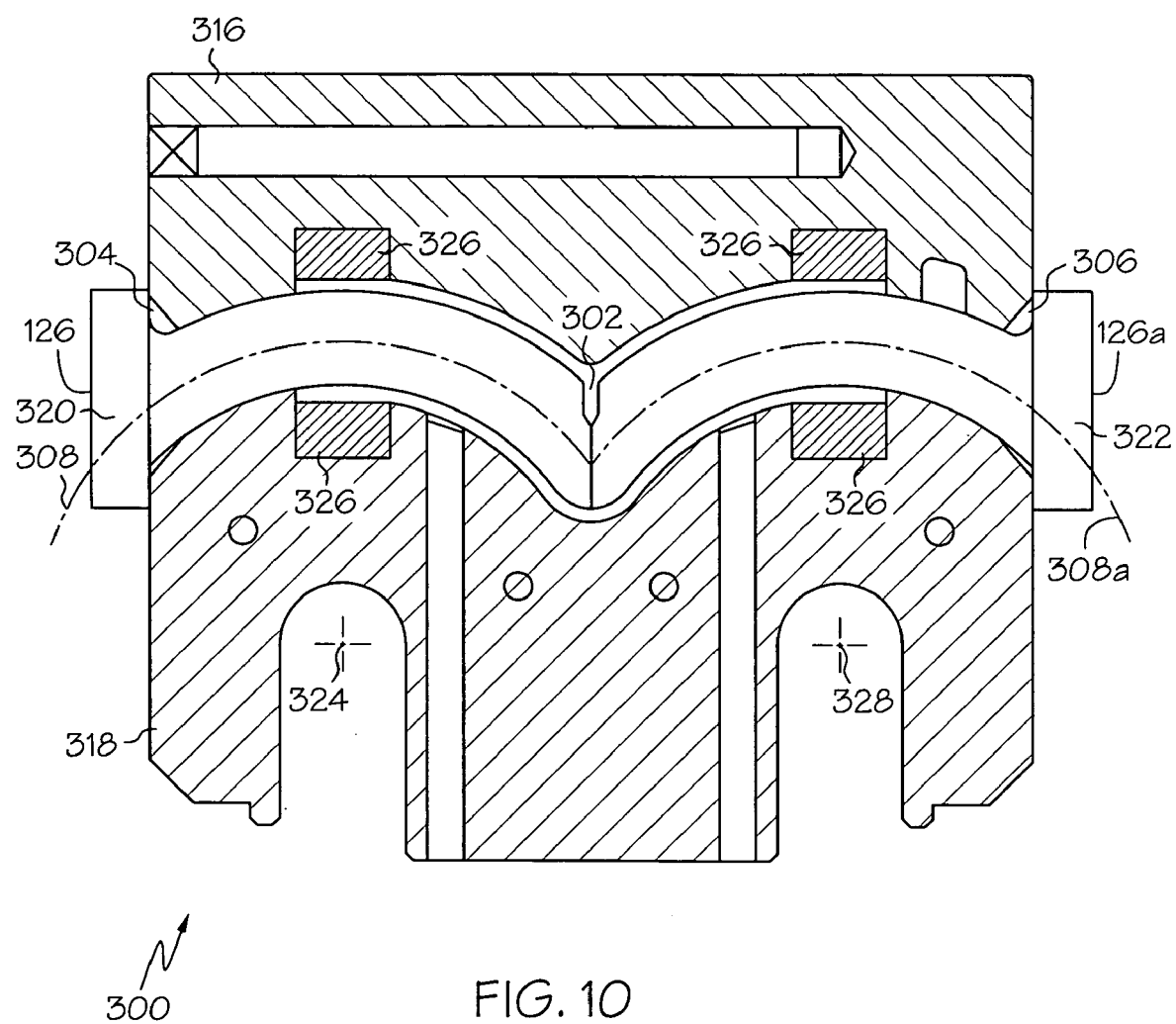
FIG. 10 is an illustration of another exemplary mold in accordance with forming exemplary embodiments of the present invention.

The first and second central radii 124, 129 are selected such that liquid maybe be trapped in at least a portion of the hollow body 112. The radii 124, 129 may be any suitable radii. For example, the radii may be from about 2.2 inches to about 2.7 inches. It will be understood that radii 124, 129 do not have to be of particular dimensions. Instead, the radii 124, 129 can be selected depending on the desired size and layout of the hollow body 112. In other examples, the radii 124, 129 may be about 2.6 inches, about 2.64 inches, or about 2.639 inches. The mold core section 126 may have a central axis 130 having a radius 128, and the radius 128 may be any suitable radius. For example, the radius 128 may be from about 2.6 inches to about 3.0 inches. It will be understood that radius 128 does not have to be of a particular dimension. Instead, the radius 128 can be selected depending on the desired size and layout of the hollow body 112. In other examples, the radius 128 may be about 2.6 inches, about 2.65 inches, or about 2.656 inches. The mold core section 126 may be tapered as illustrated in FIG. 8.

Figure 5:
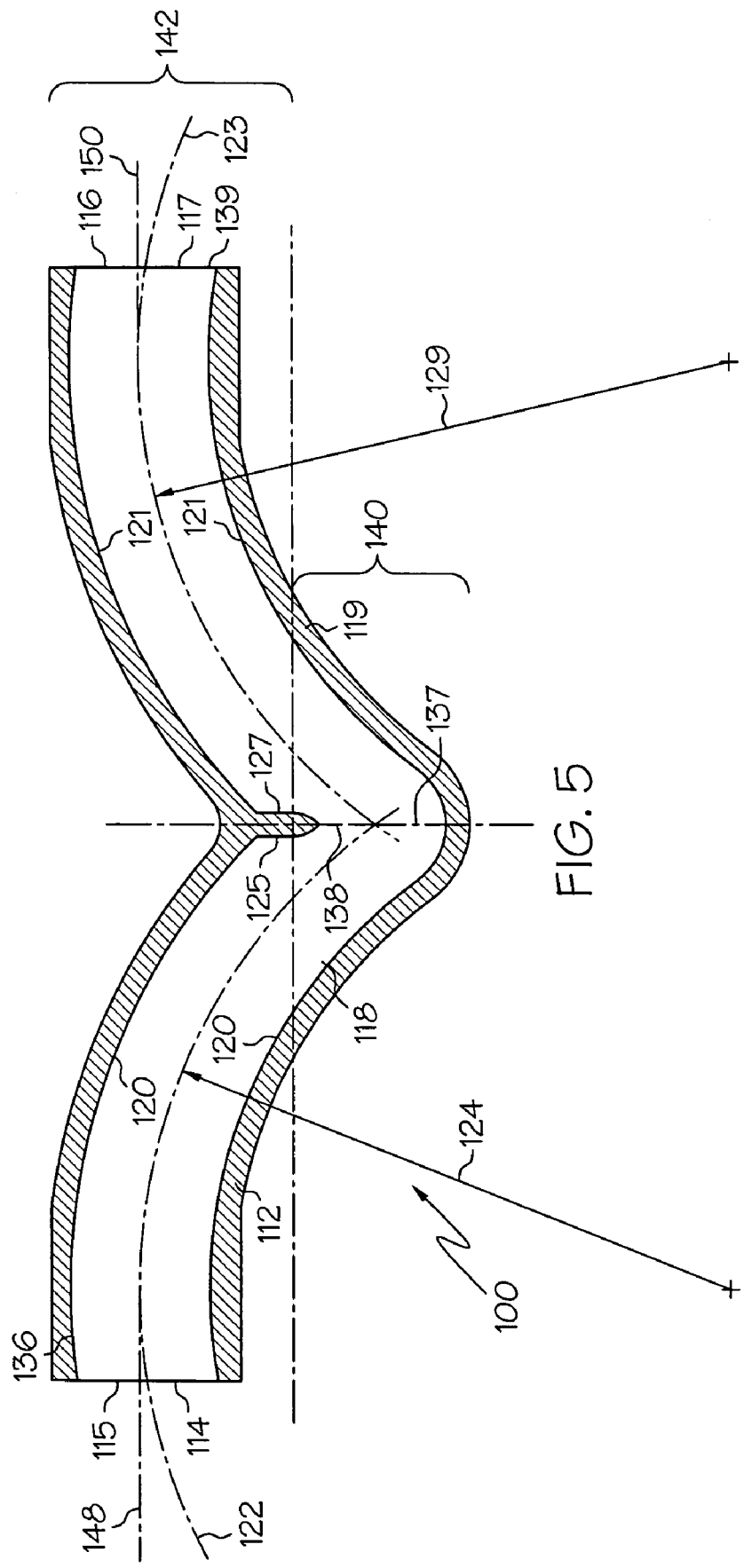
FIG. 5 is a sectional view of another exemplary fixture in accordance with embodiments of the present invention.
Figure 6:
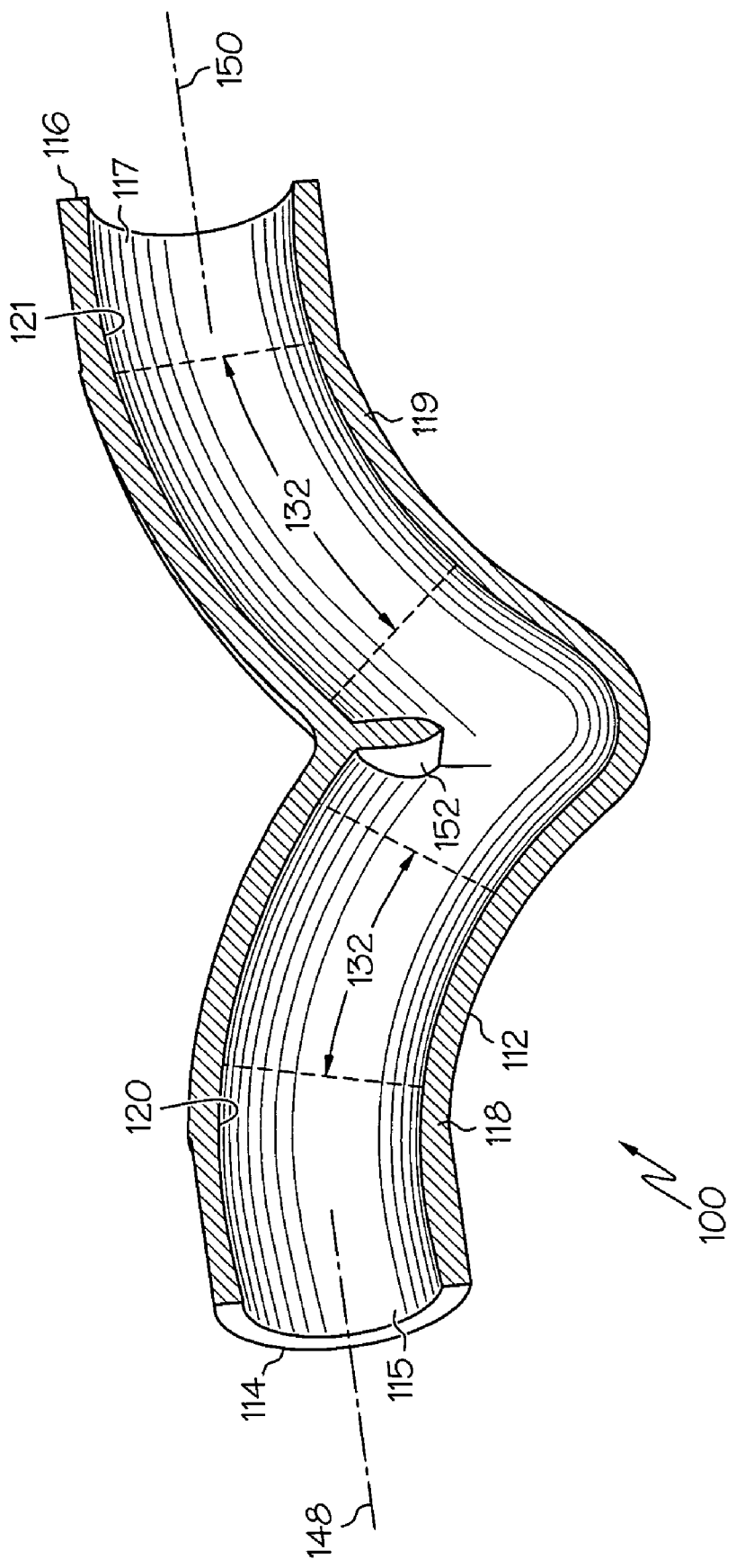
FIG. 6 is an isometric sectional view of an exemplary fixture in accordance with embodiments of the present invention.
Figure 7:
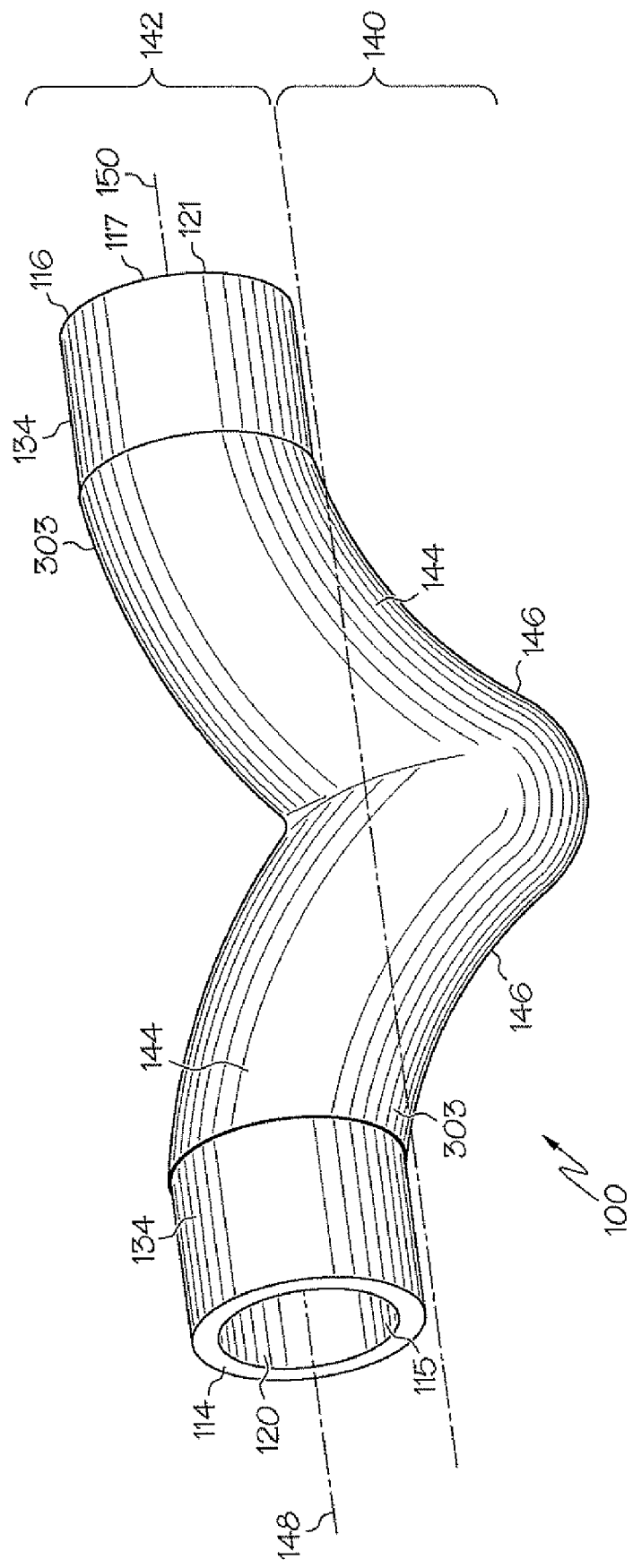
FIG. 7 is an isometric view of an exemplary fixture in accordance with embodiments of the present invention.

The first inner periphery 120 of the first curved portion 118 and the second inner periphery 121 of the second curved portion 119 may have at least a portion 132 shaped substantially like a section of a toroid. The portion 132 may be shaped substantially like a section of a torus. The portion 132 may be shaped substantially like a tapered section of a toroid or like a tapered section of a torus. The first curved portion 118 and the second curved portion 119 may be disposed to from a c-trap as illustrated in FIGS. 5-7. For purposes of defining and describing the present invention, the term "c-trap" shall be understood as referring to a hollow body having two curved portions. The first curved portion 118 and the second curved portion 119 may be disposed such that the first central axis 122 of the first curved portion 118 meets to form a "V" shape with the central axis 123 of the second curved portion 119.

The first end and second ends 114, 116 of the hollow body 112 may be disposed such that a cylindrical tube (not shown) may be fitted over the first end 114 and/or the second end 116 of the hollow body 112. For example, as shown in FIG. 7, the first end 114 or the second end 116 may have an area 134 that is cylindrically shaped so that a cylindrical tube may be fitted over at least a portion of the area 134.

The first curved portion 118 has a first end 136 proximate to the first end 114 of the hollow body 112 and a second end 138. The second curved portion 119 has a first end 137 and a second end 139 proximate to the second end 116 of the hollow body 112. The second end 136 of the first curved portion 118 may have a first inner wall portion 125 that extends into the interior of the hollow body 112 toward the first axis 122. The first end 137 of the second curved portion 119 may have a second inner wall portion 127 that extends into the interior of the hollow body 112 toward the second axis 123. The first inner wall portion 125 and the second inner wall portion 127 may be disposed to form a shaped extension 135 extending into the interior of the hollow body 112. The shaped extension 135 may comprise a dam.

Referring again to FIGS. 5, 6, and 7, the hollow body 112 has a lower portion 140 and an upper portion 142. The lower portion 140 may form a vessel for holding liquid. A part 135 of the upper portion 142 may extend into the vessel 140. The part 135 of the upper portion 142 extending into the vessel 140 may cooperate with liquid in the vessel 140 to act as a barrier to prevent air from traveling between the first opening 115 and the second opening 117. The part 135 may be a dam. The dam 135 may be molded integrally with the hollow body 112. The dam 135 may have at least a portion that is of substantially uniform thickness, and the dam 135 may have one or more faces such as face 152 that may be planar or curved.

The vessel 140 is molded integrally with the hollow body 112. The part 135 of the upper portion 142 extending into the vessel 140 may allow liquid to flow between the second opening 117 to the first opening 115. The hollow body 112 is formed of at least one tube-like member 144 and the vessel 140 is formed at least in part by adjacent bends 146 in the tube-like member 144. The first opening 115 has a central axis 148 and the second opening has a central axis 150. The central axis 148 of the first opening 115 may be substantially parallel to the central axis 150 of the second opening 117.

The fixture 100 may trap condensation between an air conditioned environment and an ambient environment, and the fixture 100 may prevent air from entering the air conditioned environment via the fixture 10. For example, as discussed above, the dam 135 may cooperate with condensation in the hollow body 112 to prevent air from flowing from a second opening 117 to a first opening 115. In one example, the second opening 117 may be in communication with an air conditioning system, and condensation from the air conditioning system may enter the hollow body 112 from the second opening 117. The dam 135 may cooperate with trapped condensation from the air conditioning system to prevent air from flowing from the first opening 115 to the second opening 117.

Referring now to FIGS. 1, 3, 4, and 9, a mold 200 for molding a hollow body 12 is illustrated. The mold 200 has at least one mold cavity 202 disposed to define the outer periphery [???] 203 of a hollow body 12 having at least a first curved portion 18. The mold cavity 202 has a first end 204 and a second end 206. A first inner mold core 26 is disposed in the mold cavity 202 to define the inner periphery 20 of the first curved portion 18, and the first inner mold core 26 has a first end 220 that is disposed proximate to the first end 204 of the mold cavity 202. The first inner mold core 26 has a second end 222. The first inner mold core 26 has a first central axis 208 having a radius selected such that the first inner mold core 26 may be removed from the hollow body 12 in the direction of the first end 204 of the mold cavity 202 after the hollow body 12 is molded. The radius of the first inner mold core 26 is selected such that liquid may be trapped along at least of portion of the hollow body 12 after the hollow body 12 is molded.

The second end 222 of the first inner mold core 26 may have a first mold feature 210 to define a first inner wall portion 25 extending into the interior of the hollow body 12. The first inner mold core 26 may have a substantially toroidal surface 212. The mold 200 may have a second inner mold core 214 disposed in the mold cavity 202 to define an inner periphery of the remainder of the hollow body 12. The mold cavity 202 may also have a portion or portions 226 disposed to provide an area 34 on the hollow body 12 over which a cylindrical tube may be fitted. The mold cavity 202, first inner mold core 26 and second inner mold core 214 may be disposed to define a p-trap hollow body 12 as shown in FIG. 3. The mold cavity 202 may be defined within a first mold core section 220 and a second mold core section 222.

The fixture 10 may be made by injecting moldable plastic into the interior of the mold 200 so that the area of the mold cavity 302 not occupied by the mold cores 126, 214 is filled with plastic. The plastic may be injected via injection ports (not shown) or in any other suitable manner. As discussed above, the outer periphery 203 of the hollow body 12 is defined by the mold cavity and the inner periphery of the hollow body 12 is defined by the first and second mold core sections 26, 214. Once the moldable plastic is injected into the mold cavity 202, the first mold core section 220 or the second mold core section 222 may be moved slightly to partially free (e.g., release) the fixture 10 from the mold 200. The first inner mold core 26 is then removed from the hollow body 12 of the fixture 10 through the first opening 15 in the first end 14 of the hollow body 12. The second mold core 214 is also removed through the second opening 17 of the second end 16 of the hollow body 12.

The first mold core 26 may be removed in any suitable manner. For example, the first mold core 26 may be removed by pivoting an arm (not shown) affixed to the first inner mold core 26 about a first axis 224 such that the arm sweeps along the radius of the central axis 208 of the first inner mold core 26. The arm may be pivoted until the first inner mold core 26 is removed from the interior of the hollow body 12. Similarly, the second mold core section 214 may be removed in any suitable manner. After the mold core sections are removed, mold halves 216, 218 may be separated to release the molded fixture.

Referring now to FIGS. 5, 7, 8, and 10, an alternative embodiment of a mold 300 for molding a hollow body 112 is illustrated. The mold 300 has at least one mold cavity 302 disposed to define the outer periphery 303 of a hollow body 112 having at least a first curved portion 118 and a second curved portion 119. The mold cavity 302 has a first end 304 and a second end 306. A first inner mold core 126 is disposed in the mold cavity 302 to define the inner periphery 120 of the first curved portion 118, and a second inner mold core 126a is disposed in the mold cavity 302 to define the inner periphery 121 of the second curved portion 119. The mold cavity 302 may also have a portion or portions 326 disposed to provide an area 134 on the hollow body 112 over which a cylindrical tube may be fitted. The first inner mold core 126 has a first end 320 that is disposed proximate to the first end 304 of the mold cavity 302, and the first inner mold core 126 has a second end 322. The second inner mold core 126a also has a first end 320 that is disposed proximate to the second end 306 of the mold cavity 302, and the second inner mold core 126a has a second end.

The first inner mold core 126 has a first central axis 308 having a radius selected such that the first inner mold core 126 may be removed from the hollow body 112 in the direction of the first end 304 of the mold cavity 302 after the hollow body 112 is molded. The radius of the first inner mold core 126 is selected such that liquid may be trapped along at least of portion of the hollow body 112 after the hollow body 112 is molded. The second inner mold core 126a also has a first central axis 308a having a radius selected such that the second inner mold core 126a may be removed from the hollow body 112 in the direction of the second end 306 of the mold cavity 302 after the hollow body 112 is molded. The radius of the second inner mold core 126a is selected such that liquid may be trapped along at least of portion of the hollow body 112 after the hollow body 112 is molded.

The second end 322 of the first inner mold core 126 and the second inner mold core 126a may have a first mold feature 310. The first mold feature 310 of the first inner mold core 126 may define a first inner wall portion 125 extending into the interior of the hollow body 112. The first mold feature 310 of the second inner mold core 126 may define a second inner wall portion 127 extending into the interior of the hollow body 112. The first and second inner wall portions 125 and 127 may form a shaped extension 135 extending into the interior of the hollow body 112. The first inner mold core 126 and the second inner mold core 126a may have a substantially toroidal surface 312. The mold cavity 302, first inner mold core 126 and second inner mold core 126a may be disposed to define a c-trap hollow body 112 as shown in FIG. 7. The mold cavity 302 may be defined within a first mold core section 320 and a second mold core section 322.

The fixture 100 may be made by injecting moldable plastic into the interior of the mold 300 so that the area of the mold cavity 302 not occupied by the mold cores 126, 126a is filled with plastic. The plastic may be injected via injection ports (not shown) or in any other suitable manner. Once the moldable plastic is injected into the mold cavity 302, the first mold core section 320 and/or the second mold core section 322 may be moved slightly to partially free (e.g., release) the fixture 100 from the mold 300. The first inner mold core 126 is removed from the hollow body 112 of the fixture 100 through the first opening 115 in the first end 114 of the hollow body 112. The second mold core 126 is also removed through the second opening 117 of the second end 116 of the hollow body 112.

The first mold core 126 and the second mold core 126a may be removed in any suitable manner. For example, the first mold core 126 may be removed by pivoting an arm (not shown) affixed to the first inner mold core 126 about a first axis 324 such that the arm sweeps along the radius of the central axis 308 of the first inner mold core 126. The arm may be pivoted until the first inner mold core 126 is removed from the interior of the hollow body 112. Similarly, the second mold core 126a may be removed by pivoting an arm (not shown) affixed to the second inner mold core 126a about a second axis 328 such that the arm sweeps along the radius of the central axis 308 of the second inner mold core 126a. The arm may be pivoted until the second inner mold core 126a is removed from the interior of the hollow body 112. After the mold core sections are removed, mold halves 316, 318 may be separated to release the molded fixture.

Figure 11:
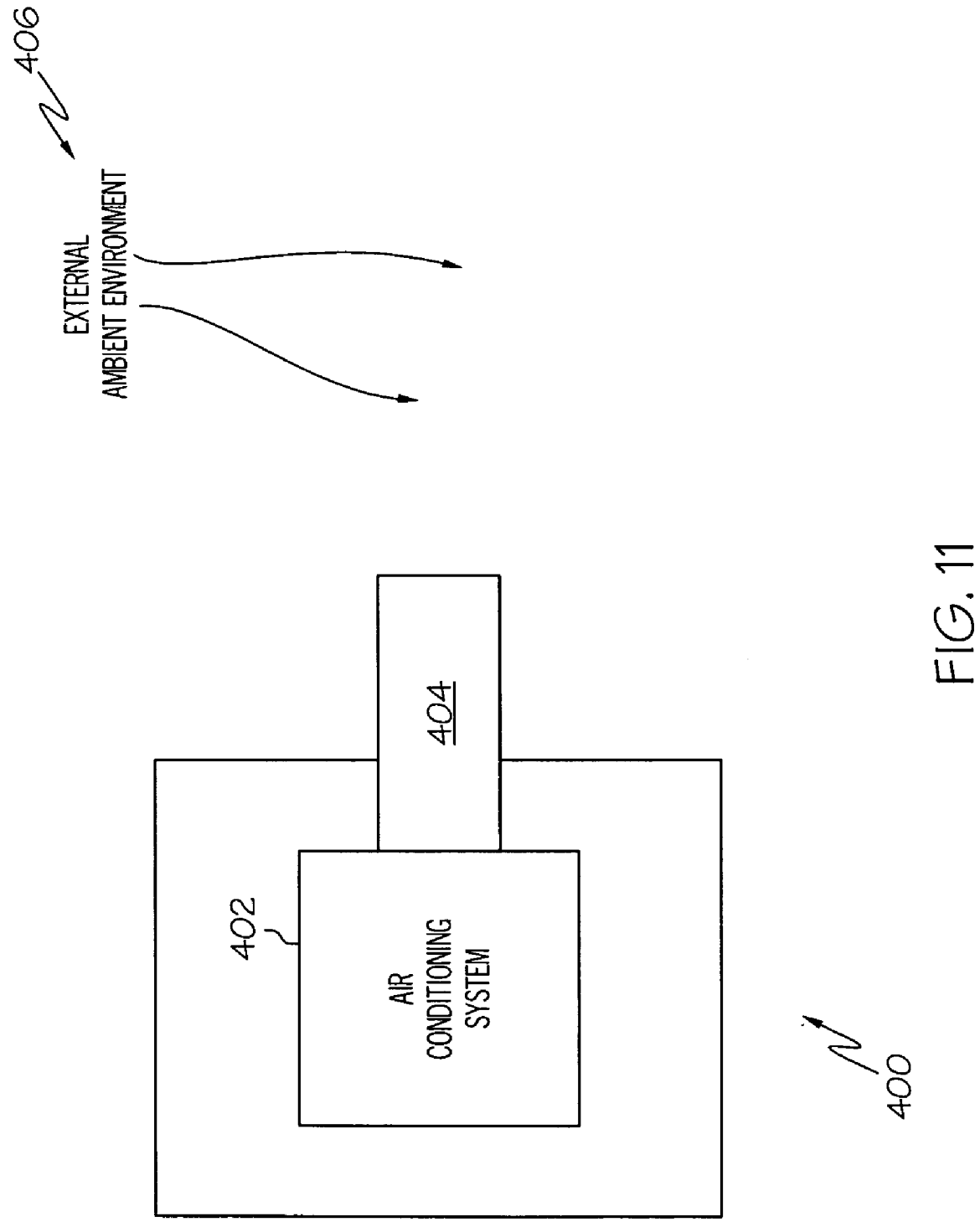
FIG. 11 is a schematic illustration of a system for conditioning air in accordance with the present invention.

Referring now to FIG. 11, a system 400 for conditioning air is systematically illustrated. The system has an air conditioning system 402 and a condensation trap 404. The condensation trap 404 is in communication with the air conditioning system 402, and the condensation trap 404 is in communication with an external ambient environment 406. The condensation trap 404 is disposed such that condensation from the air conditioning system 402 may flow through the condensation trap 404 to the external ambient environment 406 and air from the external ambient environment 406 may not flow into the air conditioning system 402. The condensation trap 402 may be a condensation trap as described above.

It will be obvious to those skilled in the art that various changes may be made without departing from the scope of the invention, which is not to be considered limited to what is described in the specification.

What is claimed is:

1. A condensation trap, comprising
a hollow body comprising:
   a first portion having a first opening at a first end, a first outer periphery about the first end, and a first inner periphery defining a first flow passage having a curved, first central axis with a constant radius of curvature, wherein the first outer periphery has a first cylindrical outer surface adapted to accept a cylindrical tube fitted over the first end of the first portion, the first cylindrical outer surface having a first centerline that is straight; and
   a second portion having a second opening and a second inner periphery defining a second flow passage, the second portion having a second central axis,
   wherein the first flow passage joins the second flow passage such that the first opening is in fluid communication with the second opening,
   wherein the second central axis intersects the first central axis at an acute angle, and
   wherein, with the first centerline oriented generally horizontal, a reservoir is formed at the intersection of the first flow passage and the second flow passage that is adapted to retain a volume of liquid at a liquid level that prevents the passage of air from the first opening to the second opening.

2. The condensation trap according to claim 1 wherein first centerline and the second central axis are generally perpendicular.

3. The condensation trap according to claim 1 wherein first central axis at the first opening and the second central axis at the second opening are generally coaxial.

4. The condensation trap according to claim 1 wherein the first inner periphery has a portion shaped substantially like a section of a toroid.

5. The condensation trap according to claim 1 wherein the first inner periphery has a portion shaped substantially like a section of a torus.

6. The condensation trap according to claim 1 wherein the second central axis is generally straight.

7. The condensation trap according to claim 1 wherein the second central axis is curved with a constant radius of curvature.

8. The condensation trap according to claim 7 wherein the second inner periphery has a portion shaped substantially like a section of a toroid.

9. The condensation trap according to claim 7 wherein the second inner periphery has a portion shaped substantially like a section of a torus.

10. The condensation trap according to claim 1 wherein the first portion has a first inner wall and the second portion has a second inner wall, wherein the first inner wall joins the second inner wall proximate the reservoir, and wherein an integral extension extends from the juncture of the first inner wall and the second inner wall into the reservoir to form a barrier that cooperates with liquid in the reservoir to prevent air from traveling between the first opening and the second opening.

11. The condensation trap according to claim 1 wherein the hollow body comprises a moldable plastic.

12. The condensation trap according to claim 1 wherein the hollow body is formed as a unitary structure.

13. The condensation trap according to claim 1 further comprising a second outer periphery of the second portion comprising a second cylindrical outer surface adapted to accept a cylindrical tube fitted over a second end of the hollow body, the second cylindrical outer surface having a second centerline that is straight.

14. A condensation trap, comprising:
a body with a hollow interior, the body having a first end having a first opening and a second end having a second opening, with the hollow interior comprising the first and second openings in fluid communication with each other; and
wherein an outer periphery of the body at the first end comprises a first cylindrical outer surface to accept a cylindrical tube fitted over the first end of the body, the first cylindrical outer surface having a first central axis that is straight;
wherein an inner periphery of the hollow interior of the body at the first end comprises a first section of a first toroid having a first central axis of rotation having a first radius;

wherein an outer periphery of the body at the second end comprises a second outer surface to accept a cylindrical tube fitted over the second end of the body, the second outer surface having a second central axis that is straight;

wherein an inner periphery of the hollow interior the body at the second end comprises a second section of a second toroid having a second central axis of rotation having a second radius;

wherein the first central axis of the first cylindrical outer surface is substantially parallel to the second central axis of the second outer surface, with the first and second openings facing in opposite directions;

wherein, with the first and second central axes oriented horizontally, the first radius of the first central axis of rotation of the first toroid curves downward from the first end and the second radius of the second central axis of rotation of the second toroid curves downward from the second end in such a manner that a vessel is formed for holding liquid in the hollow interior.

15. The condensation trap according to claim 14 wherein the first section of the first toroid at the inner periphery of the body at the first end comprises a section of a first torus.

16. The condensation trap according to claim 15 wherein the second section of the second toroid at the inner periphery of the body at the second end comprises a section of a second torus.

17. The condensation trap according to claim 14 wherein the first section of the first toroid at the inner periphery of the body at the first end comprises a section of a first torus and the second section of the second toroid at the inner periphery of the body at the second end comprises a section of a second torus.

18. The condensation trap according to claim 15 wherein the first central axis of the first cylindrical outer surface is coaxial with the second central axis of the second outer surface, with the first and second openings extending in opposite directions.

19. The condensation trap according to claim 15 wherein, the first and second central axes of rotation of the first and second toroids intersect at a "V" and the vessel for holding liquid in the hollow interior is formed beneath the first and second central axes.

20. The condensation trap according to claim 15 wherein the outer periphery of the body further comprises a first curved port ion outside the first section of the first toroid that curves along the first central axis of rotation of the first toroid, wherein the outer periphery of the body further comprises a second curved portion outside the second section of the second toroid that curves along the second central axis of rotation of the second toroid, and wherein the first curved portion and the second curved portion meet to form a "V" shape and the vessel for holding liquid in the hollow interior is formed beneath the first and second central axes.

21. The condensation trap according to claim 15 wherein the body comprises an upper portion and a lower portion, and wherein the lower portion forms the vessel for holding liquid, and part of the upper portion extends into the vessel to cooperate with liquid in the vessel to act as a baffler to prevent air from traveling between the first opening and the second opening.

22. The condensation trap according to claim 15 wherein the first and second ends and the vessel are molded integrally with the body.

23. The condensation trap according to claim 14 wherein the first section of the first toroid at the inner periphery of the body at the first end comprises a section of a first torus formed from a first circle rotated about the first central axis radius, and wherein the first central axis radius is larger than a radius of the first circle.

24. The condensation trap according to claim 23 wherein the second section of the second toroid at the inner periphery of the body at the second end comprises a section of a second torus formed from a second circle rotated about the second central axis radius, and wherein the second central axis radius is larger than a radius of the second circle.

25. The condensation trap according to claim 14 wherein the first section of the first toroid at the inner periphery of the body at the first end comprises a section of a first torus formed from a first circle rotated about the first central axis radius, and wherein the first central axis radius is larger than a radius of the first circle, and wherein the second section of the second toroid at the inner periphery of the body at the second end comprises a section of a second torus formed from a second circle rotated about the second central axis radius, and wherein the second central axis radius is larger than a radius of the second circle.

26. The condensation trap according to claim 23 wherein, the first and second central axes of rotation of the first and second toroids intersect at a "V" and the vessel for holding liquid in the hollow interior is formed beneath the first and second central axes.

27. The condensation trap according to claim 23 wherein the outer periphery of the body further comprises a first curved portion outside the first section of the first toroid that curves along the first central axis of rotation of the first toroid, wherein the outer periphery of the body further comprises a second curved portion outside the second section of the second toroid that curves along the second central axis of rotation of the second toroid, and wherein the first curved portion and the second curved portion meet to form a "V" shape and the vessel for holding liquid in the hollow interior is formed beneath the first and second central axes.

28. The condensation trap according to claim 23 wherein the body comprises an upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

29. The condensation trap according to claim 23 wherein the first and second ends and the vessel are molded integrally with the body.

30. The condensation trap according to claim 14 wherein the first section of the first toroid at the inner periphery of the body at the first end comprises a section of a tapered toroid and wherein the second section of the second toroid at the inner periphery of the body at the second end comprises a section of a tapered toroid.

31. The condensation trap according to claim 14 wherein the first section of the first toroid at the inner periphery of the body at the first end comprises a section of a tapered toroid.

32. The condensation trap according to claim 31 wherein the second section of the second toroid at the inner periphery of the body at the second end comprises a section of a tapered toroid.

33. The condensation trap according to claim 31 wherein the first central axis of the first cylindrical outer surface is coaxial with the second central axis of the second outer surface, with the first and second openings extending in opposite directions, and wherein the first and second central axes of rotation of the first and second toroids intersect at a "V" and the vessel for holding liquid in the hollow interior is formed beneath the first and second central axes.

34. The condensation trap according to claim 31 wherein the outer periphery of the body further comprises a first curved portion outside the first section of the first toroid that curves along the first central axis of rotation of the first toroid, wherein the outer periphery of the body further comprises a second curved portion outside the second section of the second toroid that curves along the second central axis of rotation of the second toroid, and wherein the first curved portion and the second curved portion meet to form a "V" shape and the vessel for holding liquid in the hollow interior is formed beneath the first and second central axes.

35. The condensation trap according to claim 31 wherein the body comprises an upper portion and a lower portion, and wherein the lower portion forms the vessel for holding liquid, and part of the upper portion extends into the vessel to cooperate with liquid in the vessel to act as a baffler to prevent air from traveling between the first opening and the second opening.

36. The condensation trap according to claim 31 wherein the first and second ends and the vessel are molded integrally with the body.

37. The condensation trap according to claim 14 wherein the first section of the first toroid at the inner periphery of the body at the first end comprises a section of a toroid formed from a closed curve rotated about the first central axis radius, and wherein first central axis radius is larger than the closed curve.

38. The condensation trap according to claim 37 wherein the second section of the second toroid at the inner periphery of the body at the second end comprises a section of a toroid formed from a closed curve rotated about the second central axis radius, and wherein second central axis radius is larger than the closed curve.

39. The condensation trap according to claim 14 wherein the first section of the first toroid at the inner periphery of the body at the first end comprises a section of a toroid formed from a first closed curve rotated about the first central axis radius, the first central axis radius being larger than the second closed curve, and wherein the second section of the second toroid at the inner periphery of the body at the second end comprises a section of a toroid formed from a second closed curve rotated about the second central axis radius, the second central axis radius being larger than the second closed curve.

40. The condensation trap according to claim 37 wherein the first central axis of the first cylindrical outer surface is coaxial with the second central axis of the second outer surface, with the first and second openings extending in opposite directions, and wherein, the first and second central axes of rotation of the first and second toroids intersect at a "V" and the vessel for holding liquid in the hollow interior is formed beneath the first and second central axes.

41. The condensation trap according to claim 37 wherein the outer periphery of the body further comprises a first curved portion outside the first section of the first toroid that curves along the first central axis of rotation of the first toroid, wherein the outer periphery of the body further comprises a second curved portion outside the second section of the second toroid that curves along the second central axis of rotation of the second toroid, and wherein the first curved portion and the second curved portion meet to form a "V" shape and the vessel for holding liquid in the hollow interior is formed beneath the first and second central axes.

42. The condensation trap according to claim 37 wherein the body comprises an upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

43. The condensation trap according to claim 14 wherein the first central axis of the first cylindrical outer surface is coaxial with the second central axis of the second outer surface, with the first and second openings facing opposite directions, and wherein, the first and second central axes of rotation of the first and second toroids intersect at a "V" and the vessel for holding liquid in the hollow interior is formed beneath the first and second central axes.

44. The condensation trap according to claim 14 wherein the outer periphery of the body further comprises a first curved portion outside the first section of the first toroid that curves along the first central axis of rotation of the first toroid, wherein the outer periphery of the body further comprises a second curved portion outside the second section of the second toroid that curves along the second central axis of rotation of the second toroid, and wherein the first curved portion and the second curved portion meet to form a "V" shape and the vessel for holding liquid in the hollow interior is formed beneath the first and second central axes.

45. The condensation trap according to claim 14 wherein the body comprises an upper portion and a lower portion, and wherein the lower portion forms the vessel for holding liquid, and part of the upper portion extends into the vessel to cooperate with liquid in the vessel to act as a baffler to prevent air from traveling between the first opening and the second opening.

46. The condensation trap according to claim 14 wherein the first and second ends and the vessel are molded integrally with the hollow body.

47. A condensation trap, comprising:
a body with a hollow interior, the body having a first end having a first opening and a second end having a second opening, with the hollow interior comprising the first and second openings in fluid communication with each other; and
wherein an outer periphery of the body at the first end comprises a first cylindrical outer surface to accept a cylindrical tube fitted over the first end of the body, the first cylindrical outer surface having a first central axis;
wherein an inner periphery of the hollow interior of the body at the first end comprises a section of a toroid having a central axis of rotation having a radius;
wherein an outer periphery of the body at the second end comprises a second outer surface to accept a cylindrical tube fitted over the second end of the body, the second outer surface having a second central axis;
wherein the first central axis of the first cylindrical outer surface is approximately perpendicular to the second central axis of the second outer surface;
wherein, with the first central axis oriented horizontally and the second central axis oriented vertically, the radius of the central axis of rotation of the toroid curves downward from the first end in such a manner that a vessel is formed for holding liquid in the hollow interior.

48. The condensation trap according to claim 47 wherein the section of the toroid at the inner periphery of the body at the first end comprises a section of a torus.

49. The condensation trap according to claim 48 wherein, with the first central axis oriented horizontally and the second central axis oriented vertically, the radius of the central axis of rotation of the toroid curves downward from the first end and intersects the second central axis to form a "V" shape in such a manner that the vessel for holding liquid in the hollow interior is formed beneath the first central axis.

50. The condensation trap according to claim 48 wherein the second end is non-curved.

51. The condensation trap according to claim 48 wherein the outer periphery of the body further comprises a first curved portion outside the first section of the first toroid that curves along the first central axis of rotation of the first toroid, wherein the outer periphery of the body further comprises a second non-curved portion outside the second end, and wherein the first curved portion and the second non-curved curved portion meet to form a "V" shape and a vessel is formed beneath the first central axis for holding liquid in the hollow interior.

52. The condensation trap according to claim 48 wherein the body comprises upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

53. The condensation trap according to claim 47 wherein the section of the toroid at the inner periphery of the body at the first end comprises a section of a torus formed from a circle rotated about the central axis radius, and wherein central axis radius is larger than a radius of the circle.

54. The condensation trap according to claim 53 wherein, with the first central axis oriented horizontally and the second central axis oriented vertically, the radius of the central axis of rotation of the toroid curves downward from the first end and intersects the second central axis to form a "V" shape in such a manner that the vessel for holding liquid in the hollow interior is formed beneath the first central axis.

55. The condensation trap according to claim 53 wherein the second end is non-curved.

56. The condensation trap according to claim 53 wherein the outer periphery of the body further comprises a first curved portion outside the first section of the first toroid that curves along the first central axis of rotation of the first toroid, wherein the outer periphery of the body further comprises a second non-curved portion outside the second end, and wherein the first curved portion and the second non-curved curved portion meet to form a "V" shape and a vessel is formed beneath the first central axis for holding liquid in the hollow interior.

57. The condensation trap according to claim 53 wherein the body comprises upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

58. The condensation trap according to claim 47 wherein the section of the toroid at the inner periphery of the body at the first end comprises a section of a tapered toroid.

59. The condensation trap according to claim 58 wherein, with the first central axis oriented horizontally and the second central axis oriented vertically, the radius of the central axis of rotation of the toroid curves downward from the first end and intersects the second central axis to form a "V" shape in such a manner that the vessel for holding liquid in the hollow interior is formed beneath the first central axis.

60. The condensation trap according to claim 58 wherein the outer periphery of the body further comprises a first curved portion outside the first section of the first toroid that curves along the first central axis of rotation of the first toroid, wherein the outer periphery of the body further comprises a second non-curved portion outside the second end, and wherein the first curved portion and the second non-curved curved portion meet to form a "V" shape and a vessel is formed beneath the first central axis for holding liquid in the hollow interior.

61. The condensation trap according to claim 58 wherein the body comprises upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

62. The condensation trap according to claim 47 wherein the section of the toroid at the inner periphery of the body at the first end comprises a section of a toroid formed from a closed curve rotated about the central axis radius, and wherein central axis radius is larger than the closed curve.

63. The condensation trap according to claim 62 wherein, with the first central axis oriented horizontally and the second central axis oriented vertically, the radius of the central axis of rotation of the toroid curves downward from the first end and intersects the second central axis to form a "V" shape in such a manner that the vessel for holding liquid in the hollow interior is formed beneath the first central axis.

64. The condensation trap according to claim 62 wherein the second end is non-curved.

65. The condensation trap according to claim 62 wherein the outer periphery of the body further comprises a first curved portion outside the first section of the first toroid that curves along the first central axis of rotation of the first toroid, wherein the outer periphery of the body further comprises a second non-curved portion outside the second end, and wherein the first curved portion and the second non-curved curved portion meet to form a "V" shape and a vessel is formed beneath the first central axis for holding liquid in the hollow interior.

66. The condensation trap according to claim 62 wherein the body comprises upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

67. The condensation trap according to claim 47 wherein, with the first central axis oriented horizontally and the second central axis oriented vertically, the radius of the central axis of rotation of the toroid curves downward from the first end and intersects the second central axis to form a "V" shape in such a manner that the vessel for holding liquid in the hollow interior is formed beneath the first central axis.

68. The condensation trap according to claim 47 wherein the second end is non-curved.

69. The condensation trap according to claim 47 wherein the outer periphery of the body further comprises a first curved portion outside the first section of the first toroid that curves along the first central axis of rotation of the first toroid, wherein the outer periphery of the body further comprises a second non-curved portion outside the second end, and wherein the first curved portion and the second non-curved curved portion meet to form a "V" shape and a vessel is formed beneath the first central axis for holding liquid in the hollow interior.

70. The condensation trap according to claim 47 wherein the body comprises upper portion and a lower portion, and wherein the lower portion forms the vessel for holding liquid, and part of the upper portion extends into the vessel to cooperate with liquid in the vessel to act as a barrier to prevent air from traveling between the first opening and the second opening.

71. The condensation trap according to claim 47 wherein the first and second ends and the vessel are molded integrally with the body.

* * * * *

UNITED STATES PATENT AND TRADEMARK OFFICE
CERTIFICATE OF CORRECTION

PATENT NO. : 7,428,909 B2 Page 1 of 1
APPLICATION NO. : 10/984479
DATED : September 20, 2008
INVENTOR(S) : Donald J. Klein and Robert P. Scifres It is certified that error appears in the above-identified patent and that said Letters Patent is hereby corrected as shown below:

Claim 20, Column 11, line 45, after "curved" please delete "port ion" and insert -- portion --.

Claim 21, Column 11, line 58, please delete "baffler" and insert -- barrier --.

Claim 35, Column 13, line 16, please delete "baffler" and insert -- barrier --.

Claim 45, Column 14, line 24, please delete "baffler" and insert -- barrier --.

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,428,909 B2
APPLICATION NO. : 10/984479
DATED : September 30, 2008
INVENTOR(S) : Donald J. Klein and Robert P. Scifres It is certified that error appears in the above-identified patent and that said Letters Patent is hereby corrected as shown below:

Claim 20, Column 11, line 45, after "curved" please delete "port ion" and insert -- portion --.

Claim 21, Column 11, line 58, please delete "baffler" and insert -- barrier --.

Claim 35, Column 13, line 16, please delete "baffler" and insert -- barrier --.

Claim 45, Column 14, line 24, please delete "baffler" and insert -- barrier --.

This certificate supersedes the Certificate of Correction issued December 30, 2008.

Signed and Sealed this

Third Day of February, 2009

JOHN DOLL
*Acting Director of the United States Patent and Trademark Office*